Dec. 10, 1929.   I. T. BORLAND   1,738,517
SCREEN FOR AUTOMOBILES
Filed June 22, 1927
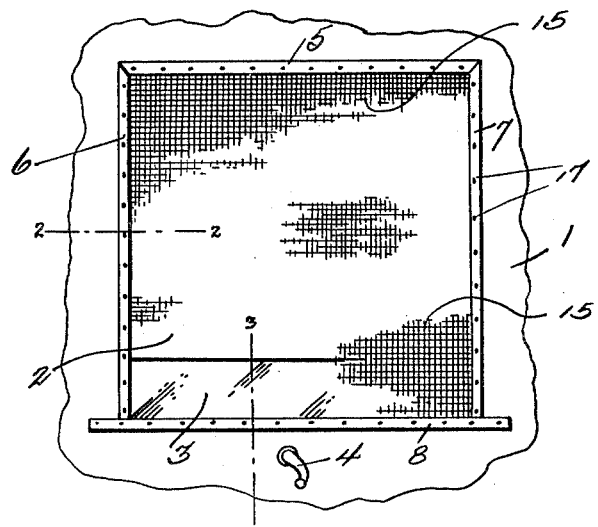
FIG-1-
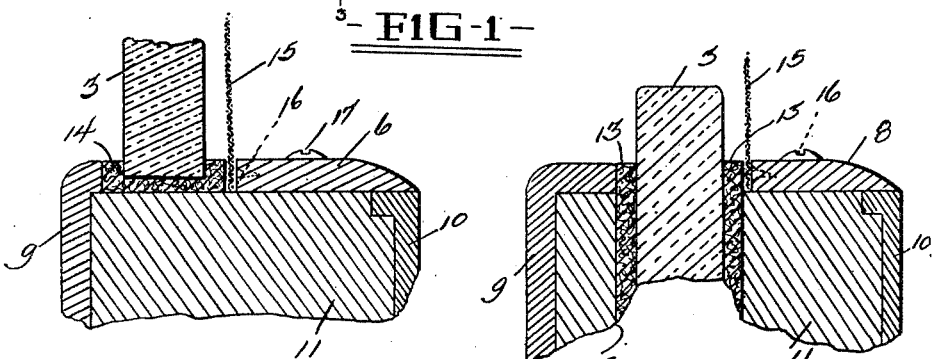
-FIG-2-   -FIG-3-
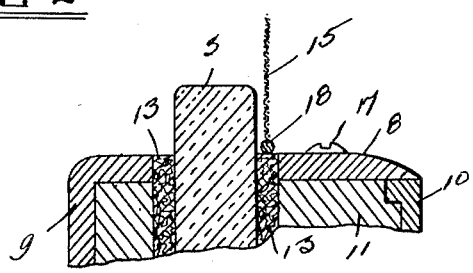
-FIG-4-
INVENTOR.
IRA T. BORLAND,
BY
ATTORNEY.

Patented Dec. 10, 1929

1,738,517

UNITED STATES PATENT OFFICE

IRA T. BORLAND, OF GRANVILLE, ILLINOIS

SCREEN FOR AUTOMOBILES

Application filed June 22, 1927. Serial No. 200,622.

My present invention in its broad aspect has reference to improvements in screens for the windows of closed automobiles and other closed vehicles, and more particularly it is my purpose to provide in the simplest and most effective manner a relatively permanent screening device for the windows of automobiles and other vehicles, which may be sold at a small retail cost and mounted in a conventional type of a closed automobile without special tools, or the services of a skilled mechanic, or in any way modifying the present structure of such vehicles.

Certain of the principal objects of my invention may be briefly defined as follows.

First: The frame to which my screen is attached conforms in all details to the moulding around the windows of closed automobiles now on the market, consequently my screen when it is sold is provided with said framing devices (which resemble mouldings of the windows of closed cars, and the screen may be mounted in the window of a closed automobile by simply removing the ordinary moulding thereabouts and attaching the frame of my screen by the same screws which were used in attaching the moulding;

Second: The tacks, screws or any attaching means used in attaching my screen to its frame are concealed back of the felt or leather material used in absorbing the vibration of the pane of the window of a closed automobile, thus preventing scratching of the pane by the attaching means for the screen;

Third: My screen when in place upon a window of an automobile can not be tampered with by children or the like and forms a proper barrier to the window so that such window need not be raised or closed when the car is locked;

Fourth: My screen is adapted to form a permanent part of the vehicle to which it is applied and does not detract from its appearance;

Fifth: In the modified form of my invention the framing for the lower edge of my screen is dispensed with so that the bottom moulding of the automobile window need not be removed and in its place is provided a relatively heavy wire border which lends to the attractiveness and effectiveness of the screen; and Sixth: My device may be manufactured and sold at small cost in great quantities and retailed as an automobile accessory which may be readily applied without special tools, accordingly the principal advantage of my invention resides in its simplicity.

Fig. 1 is a view of an automobile window, same being partially opened and illustrating the application of my screen;

Fig. 2 is a sectional view through the side rails of the window and taken on the line 2—2 of Fig. 1;

Fig. 3 is a section taken through the bottom rail of the window and on the line 3—3 of Fig. 1; and Fig. 4 is a sectional detail view showing the modified form of my invention which attachment of the screen to the bottom moulding of the window is eliminated in favor of the heavier wire bottom border on the screen.

In the drawings where like numerals are used to designate like or similar parts through the several views:

The numeral (1) designates the side wall of a closed automobile or other closed vehicle and (2) the window opening therein in which is slidably mounted the usual pane (3) the same being mounted for raising and lowering by the usual handling lever (4). The window opening (2) is surrounded by a top moulding (5), side mouldings (6) and (7) and a bottom moulding (8). In the usual construction of an automobile of a closed type the outer sheathing (9) and inner sheathing (10) are attached to the frame work (11) of the car the same being formed with a recess (12) to receive the pane (3). The pane (3) itself is mounted between layers (13) of felt or leather which absorbs shock and vibration and it is held in place by the mouldings (5), (6), (7) and (8). Between the mouldings (5), (6) and (7) and the sheathing (9) is a grooved felt or leather strip (14) which serves to nonvibratorily mount the window frame while permitting the same to be easily raised and lowered.

In practice I provide a mesh screen (15) of approximately the same size as the windows of the car in which my screen is to be mounted. I also provide a plurality of mouldings exactly the same in construction as the mouldings (5), (6), (7) and (8) and to these mouldings the screen is attached as by screws or tacks (16) shown in dotted lines in Figs. 2 and 3.

In mounting my screen in an automobile window the usual mouldings are removed, the screws (16) and (17) being set aside and my screen and its framing moulding are inserted in place of those removed. This places the edges of the screen against the felt or leather strips (13) and (14) so that the edges of the screen do not come in contact with the window pane (3). The screws (17) are now again inserted and my screen is held in place. The appearance of the car is in no way detracted from and any one can mount my screen without the use of special tools or the services of a skilled mechanic. In Fig. 4 I have shown a modified form of my invention. In ordinary practice the lever used in opening the doors of a closed automobile are mounted in the bottom moulding of the windows, which makes it unhandy to remove said bottom moulding. In order to facilitate the application of my screen to closed automobiles of this type I bind the lower edge of my screen (15) is weighted and bound with a heavy wire or rod (18) and do not attach it to the bottom moulding but simply allow it to rest on the surface of the felt strip (13).

While in the foregoing there has been illustrated in the drawings and described in the specification such combination and arrangement of elements as constitute the preferred embodiments of my invention, it is nevertheless desired to emphasize the fact that interpretation of the invention should only be conclusive when made in the light of the subjoined claim.

I claim:—

An attachment for automobile windows of the type having resilient padding for the window pane, comprising a screen closure of about the same size as the window opening, a combination frame for the screen and molding for the window, the side and end rails of the frame forming the side and end moldings for the window when the screen is set up, and the screen attached to the edges of the molding; the molding being removably secured to the window frame with the edge portions thereof abutting the padding about the window pane, the screen and frame being removable from the window as a unit, and the attaching means for the screen engaging in the edge portions of the frame with their heads directed toward, against and concealed by the padding.

In testimony whereof, I affix my signature hereto.

IRA T. BORLAND.